United States Patent
Crofford

(10) Patent No.: US 12,256,234 B2
(45) Date of Patent: Mar. 18, 2025

(54) TOWER DOWNTIME PREDICTION

(71) Applicant: DISH Wireless L.L.C., Englewood (CO)

(72) Inventor: Jon William Freeman Crofford, Denver, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 332 days.

(21) Appl. No.: 17/893,691

(22) Filed: Aug. 23, 2022

(65) Prior Publication Data

US 2024/0073701 A1    Feb. 29, 2024

(51) Int. Cl.
*H04W 16/22* (2009.01)
*H04B 17/373* (2015.01)
*H04W 16/18* (2009.01)

(52) U.S. Cl.
CPC .......... *H04W 16/22* (2013.01); *H04B 17/373* (2015.01); *H04W 16/18* (2013.01)

(58) Field of Classification Search
CPC ..... H04W 16/22; H04W 16/18; H04B 17/373
See application file for complete search history.

(56) References Cited

U.S. PATENT DOCUMENTS

2019/0335345 A1\* 10/2019 Yan .................. H04W 16/18
2022/0190940 A1\* 6/2022 Zaifman .............. H04B 17/26

OTHER PUBLICATIONS

"Natural Language Processing for IT Support Incidents" by Ajit Rajput, Analytic Vidhya, May 17, 2020, downloaded Sep. 17, 2024 on the internet from: https://medium.com/analytics-vidhya/natural-language-processing-for-it-support-incident-51cb35af0735 (Year: 2020).\*

\* cited by examiner

*Primary Examiner* — Charles C Jiang
*Assistant Examiner* — Margaret Marie Anderson
(74) *Attorney, Agent, or Firm* — Seed IP Law Group LLP

(57) ABSTRACT

Systems and methods are described herein for predicting tower downtimes in a cellular or wireless network and taking preemptive measures relative to the predicted downtime. One or more towers in a cellular network are selected to predict whether they are or are about to experience downtime. A prediction model trained to predict downtimes of towers sharing a characteristic with the one or more selected towers. Current information associated with the one or more selected towers is obtained and used in the prediction model to generate a downtime prediction for the one or more selected towers. The downtime prediction for the one or more selected towers is then provided to an administrator.

20 Claims, 5 Drawing Sheets

TOWER DOWNTIME PREDICTION

BACKGROUND

The use of cellular networks continues to expand and people are becoming more reliant on the speed, efficiency, and uptime of these networks. Unfortunately, various aspects of the cellular network can become unavailable from time to time. For example, a cell tower may be taken offline so that the radio hardware can be swapped out for other hardware. As another example, a power outage in the area of the cell tower may cause the cell tower to stop transmitting and receiving signals from cellular devices. The timing of when and where a cellular network may go down can be difficult to determine and maintenance can be reactionary. It is with respect to these and other considerations that the embodiments described herein have been made.

BRIEF SUMMARY

Embodiments are generally directed to systems and methods for predicting tower downtimes in a cellular or wireless network and taking preemptive measures relative to the predicted downtime. One or more towers in a cellular network are selected to predict whether they are or are about to experience downtime. A prediction model trained to predict downtimes of towers sharing a characteristic with the one or more selected towers. Current information associated with the one or more selected towers is obtained and used in the prediction model to generate a downtime prediction for the one or more selected towers. The downtime prediction for the one or more selected towers is then provided to an administrator.

In various embodiments, the prediction model is generated base on one or more types of information. In some embodiments, the prediction model is generated based on historical weather information relative to the downtimes of a set of towers that share characteristics with the one or more selected towers. In other embodiments, the prediction model is generated based on historical power-outage information relative to the downtimes of a set of towers that share characteristics with the one or more selected tower. In yet other embodiments, the prediction model is generated based on historical wired-network-downtime information relative to the downtimes of a set of towers that share characteristics with the one or more selected tower. In yet other embodiments, natural language processing is performed on the tickets associated with downtimes of a set of towers sharing the characteristic with the one or more selected towers, which is used to generate historical ticket information. This historical ticket information can then be used to generate the prediction model. In at least some embodiments, the prediction model may be generated based on the historical weather information, the historical wired-network-downtime information, the historical wired-network-downtime information, and the historical ticket information, or some combination thereof, relative to the downtimes of a set of towers.

Embodiments described herein improve the efficiency and output of cellular or wireless networks by predicting when and where towers may experience downtime and taking preemptive measures. As a result, towers can save computing resources in not trying to handover user devices to a tower that is predicted to experience downtime. Likewise, computing resources of other network-monitoring computing systems can be saved or reduced by enabling those systems to ignore, process, or manage tower downtimes before issues caused by tower downtimes can cascade through the network.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
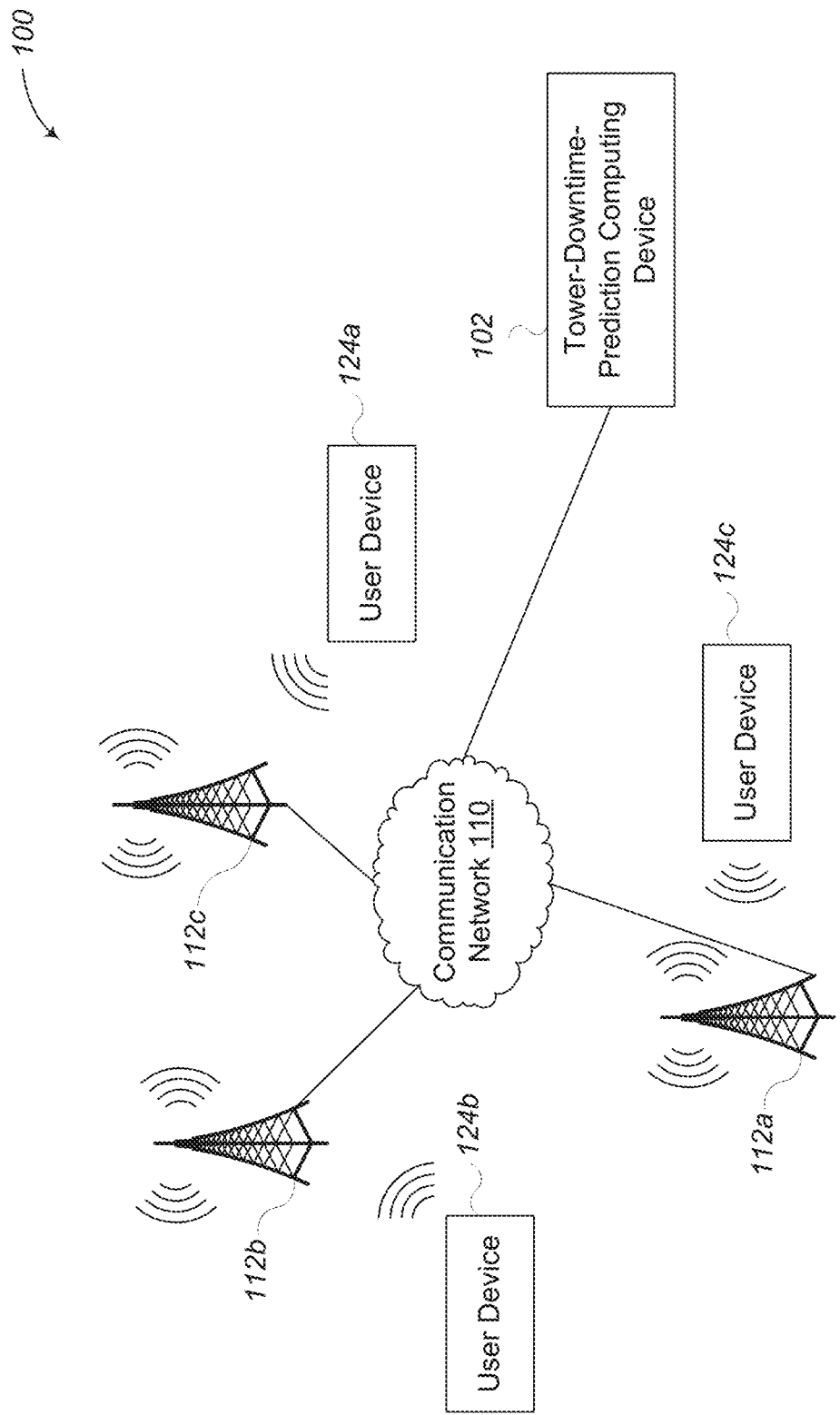
FIG. 1 illustrates a context diagram of an environment for predicting tower downtime in a wireless network in accordance with embodiments described herein.

FIG. 1 illustrates a context diagram of an environment 100 for predicting tower downtime in a wireless network in accordance with embodiments described herein. Environment 100 includes a plurality of towers 112a-112c, a plurality of user devices 124a-124b, a tower-downtime-prediction computing device 102, and a communication network 110. Communication network 110 includes one or more wired or wireless networks, which may include a series of smaller or private connected networks that carry information between the towers 112a-112c.

The user devices 124a-124c are computing devices that receive and transmit cellular communication messages with the towers 112a-112c. Examples of user devices 124a-124c may include, but are not limited to, mobile devices, smartphones, tablets, cellular-enabled laptop computers, or other computing devices that can communication with a cellular network.

The towers 112a-112c are cellular network towers that together provide the hardware infrastructure of a cellular communications network, e.g., a 5G cellular communications network. Towers 112a-112c include or may also be referred to as cells. The towers 112a-112c may include or be in communication with base stations, radio back haul equipment, antennas, or other devices, which are not illustrated for ease of discussion. Each tower 112 provides compatible cellular communications over a coverage area. The coverage area, bandwidth, and overall communication quality depends on multiple factors regarding the tower, including, but not limited to, height of the antenna of the tower above the ground, radio parameters, weather conditions, etc.

Unfortunately, towers 112a-112c can experience downtime for various reasons. A tower 112 that is experiencing downtime is a tower that is unable to manage or support communications with a user device 124. For example, the tower may have lost power and is unable to transmit signals to or receive signals from the user device. Similarly, the hardware on the tower may be malfunctioning or damaged, which is preventing the tower from properly communicating with the user device or with the backhaul wired network. As another example, the tower may be able to communicate with the user device, but the tower may not be able to process those communications due to the wired network with which the tower utilizes may be down and not accessible.

The tower-downtime-prediction computing device 102 is configured to perform embodiments described herein to generate a prediction model and employ the prediction model to determine if a select or target tower 112 is predicted to experience downtime. As described in more detail herein, the prediction model may be generated for towers that share a same or similar characteristic, such as all towers in a network, a group of towers in a defined geographical region (e.g., all towers in a zip code, neighborhood, city, or other geographical area), a group of towers that are being monitored for failures or downtime (e.g., all towers having a defined radio, or all towers having an average load above a threshold amount, etc.), or towers having a selected hardware component or a selected hardware configuration, or some combination thereof. Moreover, the prediction model may be generated from historical weather information associated with tower downtimes, historical power-outage information associated with tower downtimes, historical wired-network-downtime information associated with tower downtimes, ticket information associated with tower downtimes, or some combination thereof.

After the prediction model is generated for a set of towers, it can be employed using current data regarding one or more select or target towers to predict whether the select or target towers will experience downtime. For example, the prediction model may be generated from historical data and determine that tower downtimes typically occur after a hailstorm having penny-sized hail passes through an area of towers. In some embodiments, the prediction model may be generated independent of the cause of the downtime. Using the hailstorm example, the prediction model may not take into account that penny-sized hail destroys tower antennas. In other embodiments, the prediction may take into account the cause of the downtime. Again, referring to the hailstorm example, the prediction model may predict an antenna failure causing downtime; rather, than a radio malfunction.

In one non-limiting example, tower 112a and tower 112b may be part of the set of towers used to generate the prediction model, which is used to predict the downtime of tower 112c. In another non-limiting example, towers 112a-112c may be part of the set of towers used to generate the prediction model, which is used to predict the downtime of any of towers 112a-112c.

Figure 2:
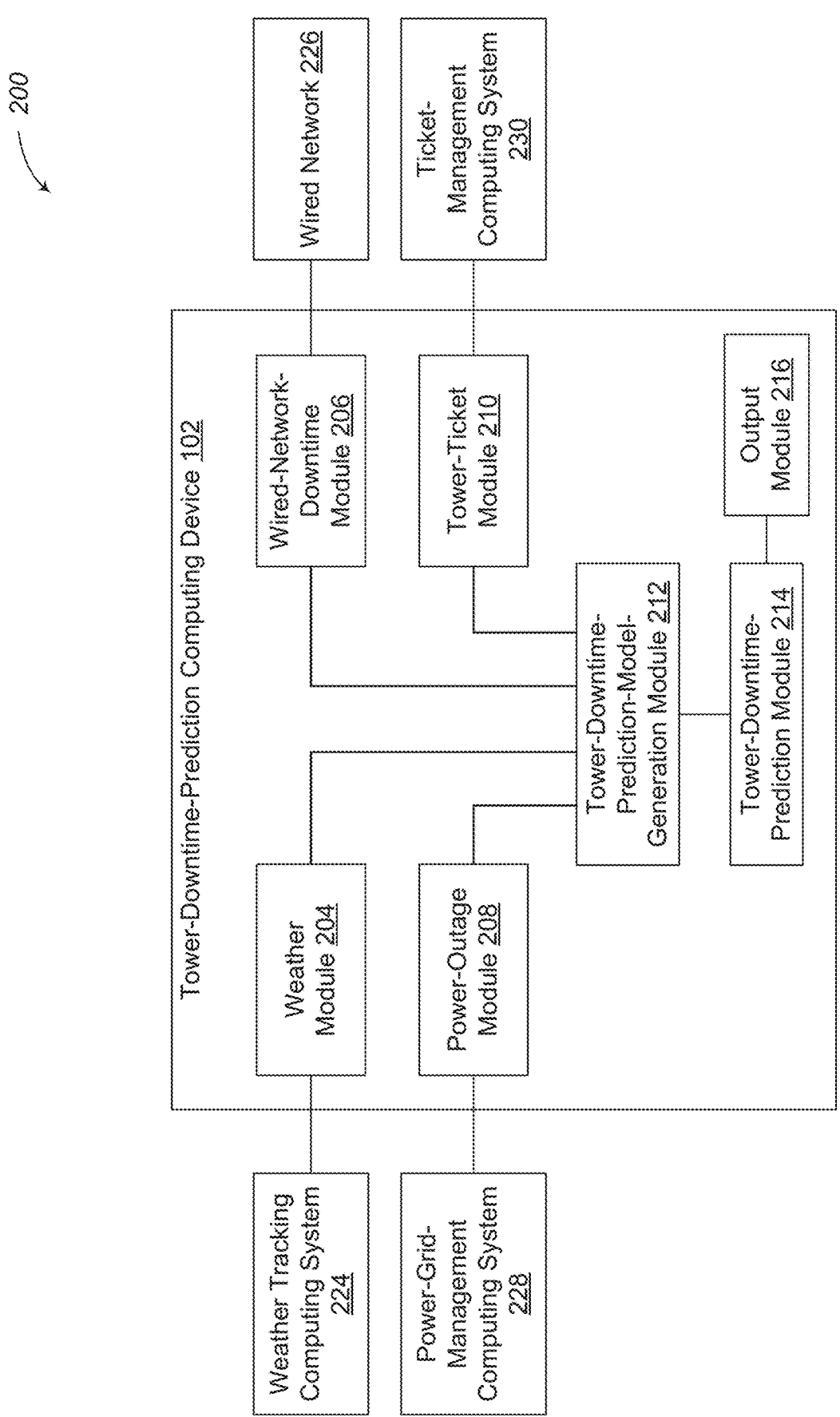
FIG. 2 is a context diagram of a non-limiting embodiment of systems that predict tower downtime in accordance with embodiments described herein.

FIG. 2 is a context diagram of a non-limiting embodiment of systems that predict tower downtime in accordance with embodiments described herein. System 200 may include the tower-downtime-prediction computing device 102 from FIG. 1, along with a weather tracking computing system 224, a wired network 226, a power-grid-management computing system 228, and a ticket-management computing system 230.

The weather tracking computing system 224 is configured to collect and track historical weather information, such as weather conditions or patterns. In various embodiments, the weather tracking computing system 224 may be maintained or managed by an external source from the tower-downtime-prediction computing device 102 or a third party.

The wired network 226 is configured to collect and track historical downtimes of one or more backhaul wired network associated with the network that is using the towers. This wired-network information may identify when one or more wired networks that support the backhaul operations of the towers go down, e.g., for routine maintenance. In various embodiments, the wired network 226 may be maintained or managed by an external source from the tower-downtime-prediction computing device 102 or a third party.

The power-grid-management computing system 228 is configured to collect historical power grid downtime information. This power grid downtime information may identify when power outages occur relative to the network. In various embodiments, the power-grid-management computing system 228 may be maintained or managed by an external source from the tower-downtime-prediction computing device 102 or a third party.

The ticket-management computing system 230 is configured to collect and track tickets that describe or identify downtimes or issues with a set of towers. In various embodiments, the ticket-management computing system 230 may be maintained or managed by an external source from the tower-downtime-prediction computing device 102 or a third party. The ticket-management computing system 230 may be configured to enable user or administrators to provide information related to towers. These tickets may also be referred to as helpdesk tickets, helpdesk requests, network feedback input, or other terms indicating that a user or administrator has provided some natural language text related to a tower.

The tower-downtime-prediction computing device 102 includes a weather module 204, a wired-network-downtime module 206, a power-outage module 208, a tower-ticket module 210, a tower-downtime-prediction-model-generation module 212, a tower-downtime-prediction module 214, and an output module 216.

The weather module 204 is configured to be in communication with the weather tracking computing system 224 to obtain the historical weather information and correlate or associate that information with a set of towers that have experienced downtimes. The wired-network-downtime module 206 is configured to be in communication with the wired network 226 to obtain the historical wired-network information and correlate or associate that information with a set of towers that have experienced downtimes. The power-outage module 208 is configured to be in communication with the power-grid-management computing system 228 to obtain the historical power-outage information and correlate or associate that information with a set of towers that have experienced downtimes.

The tower-ticket module 210 is configured to be in communication with the ticket-management computing system 230 to obtain tickets associated with a set of towers that have experienced downtimes. In various embodiments, the tower-ticket module 210 performs natural language processing on the obtained tickets to identify tower downtime information associated with the tickets. In various embodiments, the tower downtime information includes text, phrases, context, or other information relating to downtimes of the set of towers. The tower-ticket module 210 can then generate historical ticket information for the set of towers that have experienced downtime based on the tower downtime information. In various embodiments, the historical ticket information associates tower downtimes to the tower downtime information (e.g., which text, phrases, or context describes a tower that is or has experienced downtime).

In some embodiments, the different types of information may be correlated or associated to the same set of towers that have experienced downtimes. In other embodiments, the different types of information may be correlated or associated to two or more set of towers that have experienced downtimes, but the towers in each of those sets shares a same or similar characteristics, as described herein.

The tower-downtime-prediction-model-generation module 212 is configured to be in communication with the weather module 204, the wired-network-downtime module 206, the power-outage module 208, and the tower-ticket module 210 to obtain one or more types of historical information and generate a prediction model therefrom. As described herein, one or more types of historical information may be used as training data in an artificial intelligence or machine learning mechanism to generate the prediction model.

The tower-downtime-prediction module 214 obtains the prediction model from the tower-downtime-prediction-model-generation module 212. The tower-downtime-prediction module 214 also obtains current information associated with one or more select or target towers. This current information may include, but is not limited to, current weather conditions, current time or day, current wired-network conditions, current power grid conditions, or one or more tickets, or some combination thereof. The tower-downtime-prediction module 214 utilizes this current information as input to the prediction module to generate a prediction of whether the select or target down is or is about to experience downtime.

The output module 216 is configured to receive the downtime prediction from the tower-downtime-prediction module 214 and provide preemptive measures related to the predicted downtime. In various embodiments, the output module 216 sends a message, such as a text message or email message, to one or more administrators or one or more third parties indicating whether the select or target tower is or is about to experience downtime. In some embodiments, this message is sent if a tower is predicted to go down, but not sent of no tower is predicted to go down. For example, the wired-network provider may be notified of an outage of the wired network based on the predicted downtime of a tower. In various embodiments, the output module 216 may automatically generate or cause another computing system to dispatch a technician, vendor, or contractor to the tower that is predicted to experience downtime. In other embodiments, the output module 216 may automatically resolve, delete, or close a ticket, or prevent future tickets, associated with a tower if the predicted downtime for that tower is caused by a known or expected outage, such as routine maintenance on the wired network or known rolling black-outs of the power grid. In some other embodiments, the output module 216 may transmit messages or instructions to one or more towers that are near a select tower that is predicted to experience downtime. In this way, those nearby towers can take preemptive measures to reduce a load on the select tower, prevent handing over user devices to the select tower, or to monitor the select tower for performance degradation.

The operation of certain aspects will now be described with respect to FIGS. 3 and 4. In at least one of various embodiments, processes 300 and 400 described in conjunction with FIGS. 3 and 4, respectively, may be implemented by one or more processors or executed via circuitry on one or more computing devices, such as tower-downtime-prediction computing device 102 in FIG. 1.

Figure 3:
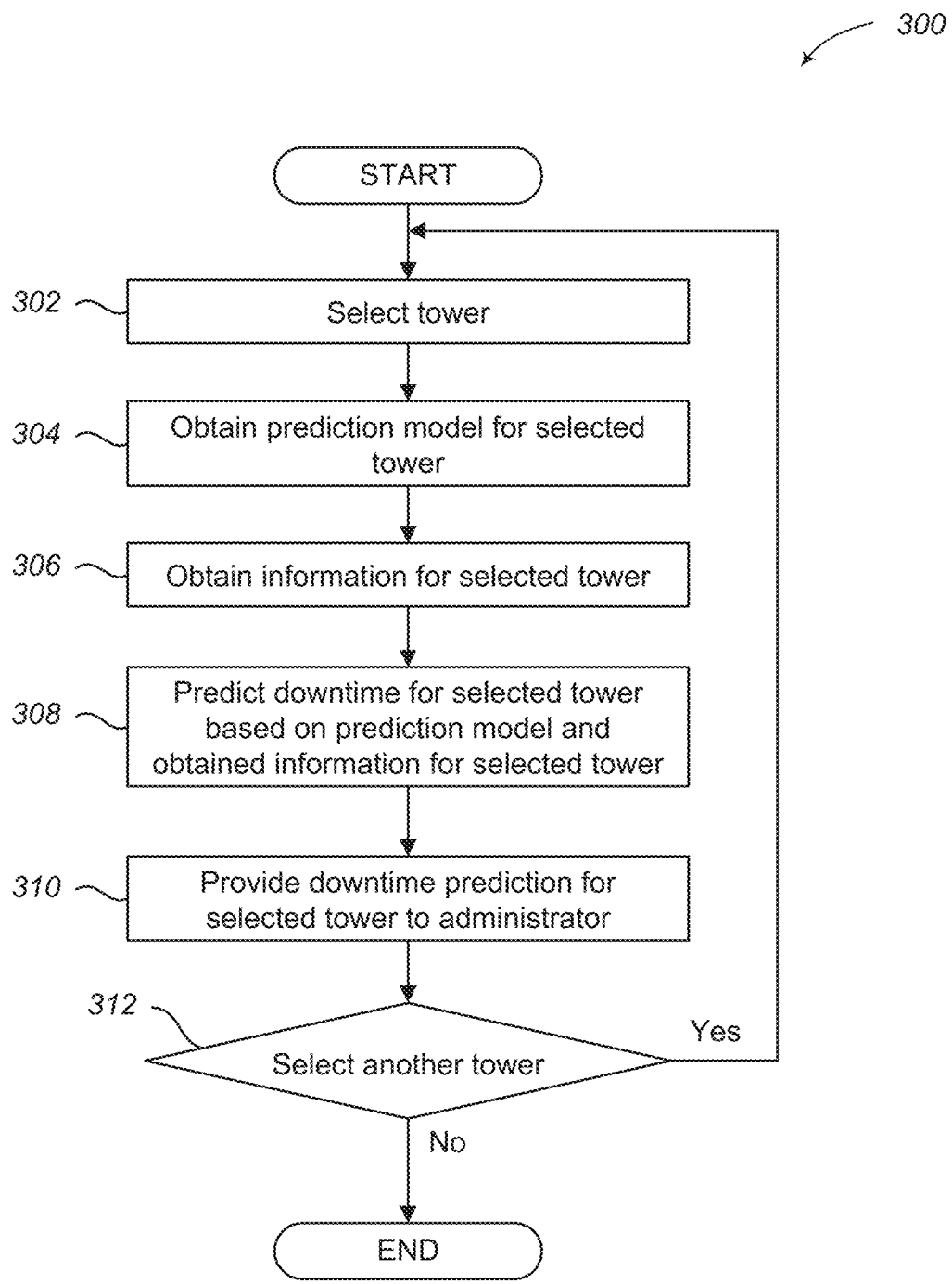
FIG. 3 illustrates a logical flow diagram showing one embodiment of an overview process for predicting tower downtime in accordance with embodiments described herein.

FIG. 3 illustrates a logical flow diagram showing one embodiment of an overview process 300 for predicting tower downtime in accordance with embodiments described herein.

Process 300 begins, after a start block, at block 302, where a tower is selected. In various embodiments, the tower is selected from a plurality of towers in a wireless network. The plurality of towers may include all towers in a network, a group of towers in a defined geographical region (e.g., all towers in a zip code, neighborhood, city, or other geographical area), a group of towers that are being monitored for failures or downtime (e.g., all towers having a defined radio, or all towers having an average load above a threshold amount, etc.), or towers having a selected hardware component or a selected hardware configuration, or some combination thereof.

Process 300 proceeds from block 302 to block 304, where a prediction model is obtained for the selected tower. In various embodiments, process 400 in FIG. 4 may be utilized to generate the obtained prediction model. Briefly, however, the prediction model may be generated using one or more artificial intelligent mechanisms, machine learning mechanisms, or other data-analysis mechanisms.

In some embodiments, separate prediction models may be generated for different types or models of towers, different geographical regions, different networks, or other tower or network characteristics, or some combination thereof. In at least one embodiment, separate prediction models may be generated for towers being monitored for different types of faults, failures, or downtime causes. The prediction model associated with the selected tower is then selected or obtained. For example, assume Prediction_Model_A is generated for towers in SampleTown and Prediction_Model_B is generated for towers in ExampleCity. In this example, Prediction_Model_B is selected if the selected tower is also located in ExampleCity.

Process 300 continues after block 304 at block 306, where information for the selected tower is obtained. In various embodiments, the obtained information is information of a similar type used to train the obtained prediction model.

For example, if historical weather information associated with tower downtimes was used to generate the prediction model, then the obtained information may include current weather conditions, recent-past (e.g., last day or last week) weather conditions, or forecasted weather conditions. As another example, if historical power-outage information associated with tower downtimes was used to generate the prediction model, then the obtained information may include an indication that a power outage in the same area as the selected tower has occurred. In yet another example, if historical wired-network-downtime information associated with tower downtimes was used to generate the prediction model and the prediction model indicates that the wired network goes down on specific days at specific times, then the obtained information may include a current time and day. And in yet another example, if ticket information associated with tower downtimes was used to generate the prediction model, then the obtained information may include one or more new tickets that have been issued.

If some combination of historical weather information, historical power-outage information, historical wired-network-downtime information, or ticket information was used to generate the prediction model, then the obtained information includes the same combination, or a subset thereof. For example, if historical weather information, historical power-outage information, and ticket information was used to generate the prediction model, then the obtained information may include current weather information, current power-outage information, or a current ticket, or some combination thereof.

Process 300 proceeds from block 306 to block 308, where one or more downtimes is predicted for the selected towers based on the prediction model and the obtained information. In at least one embodiment, the obtained information is provided to the prediction model as an input, and the prediction model outputs a prediction of whether or when the selected will or is likely to go down. In some embodiments, the prediction may be a binary yes or no on whether the selected tower will or is likely to go down. In other embodiments, the prediction may be a percentage or likelihood that the selected tower will or is likely to go down. In yet other embodiments, the prediction may be a date or operational timeframe of when the selected tower will or is likely to go down. A prediction that the selected tower is likely to go down refers to a prediction where it is more likely than not that the predicted tower will do down in a selected threshold amount of time.

Process 300 continues from block 308 at block 310, where the downtime prediction for the selected tower is provided to an administrator. In some embodiments, the prediction is sent to a computing device of the administrator, such as via text message or email message. In yet other embodiments, the administrator may utilize a portal or dashboard to monitor a plurality of towers, and the prediction of the selected tower can be viewed by the administrator within the portal or dashboard.

Process 300 proceeds from block 310 to decision block 312, where a determination is made whether another tower is selected. In some embodiments, a plurality of towers are selected is a defined order so that a downtime prediction can be generated for each of the plurality of towers. As mentioned above, the plurality of towers may include all towers in a network, a group of towers in a defined geographical region or area, a group of towers that are being monitored for failures or downtime, or towers having a selected hardware component or a selected hardware configuration, or some combination thereof. Another tower is selected if there are additional towers in the plurality of towers that have not yet had a downtime prediction generated. If another tower is to be selected, process 300 loops from decision block 312 to block 302; otherwise, process 300 terminates or otherwise returns to a calling process to perform other actions.

Figure 4:
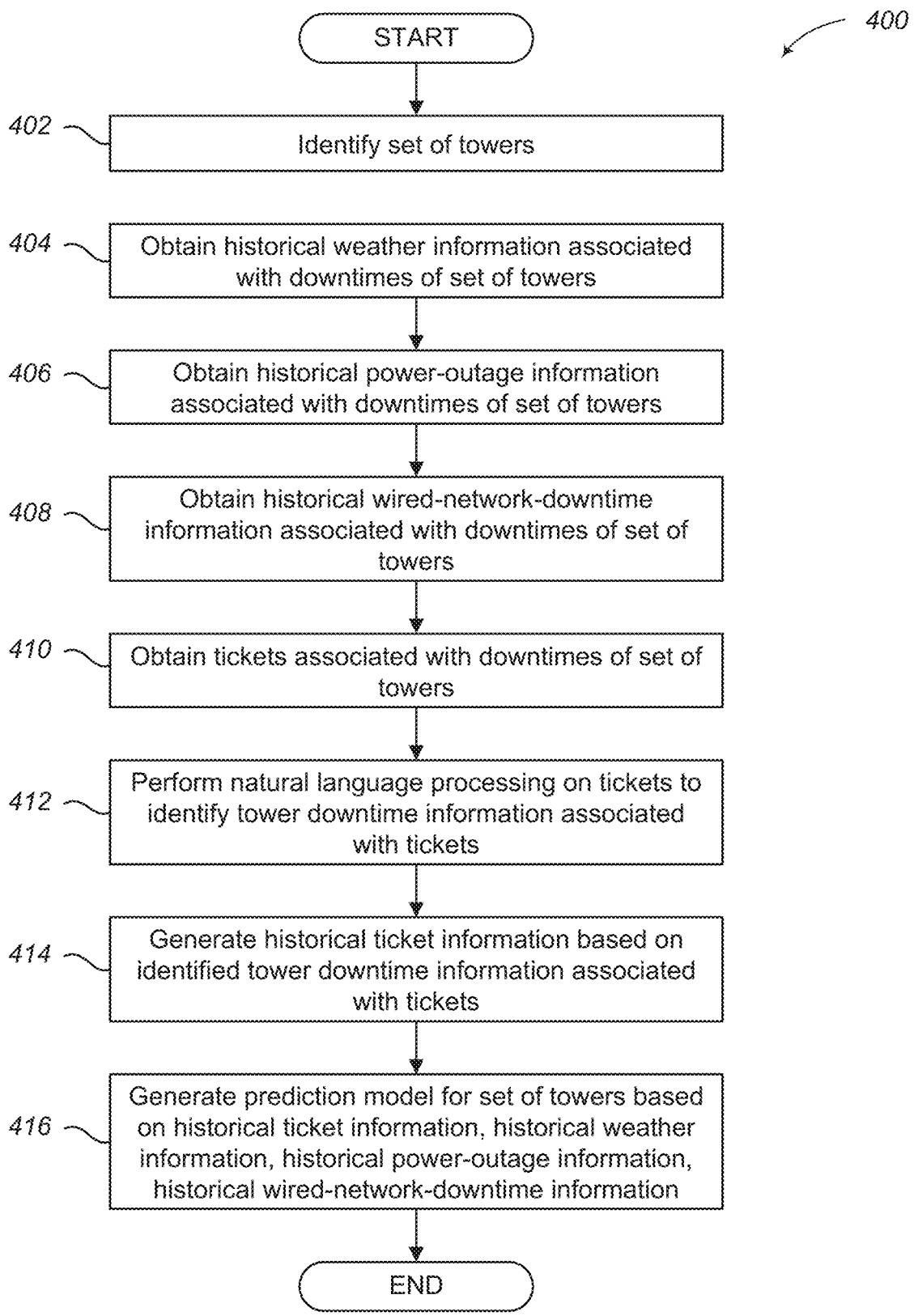
FIG. 4 illustrates a logical flow diagram showing one embodiment of a process for generating a prediction model used to predict tower downtime in accordance with embodiments described herein.

FIG. 4 illustrates a logical flow diagram showing one embodiment of a process 400 for generating a prediction model used to predict tower downtime in accordance with embodiments described herein.

Process 400 begins, after a start block, at block 402, where a set of towers is identified. The set of towers may include all towers in a network, a group of towers in a defined geographical region (e.g., all towers in a zip code, neighborhood, city, or other geographical area), or a group of towers that are being monitored for failures or downtime (e.g., all towers having a defined radio, or all towers having an average load above a threshold amount, etc.), towers having a selected hardware component or a selected hardware configuration, or some combination thereof.

In some embodiments, the set of towers may be all or a subset of the plurality of towers from which a tower is selected at block 302 in FIG. 3. In other embodiments, the set of towers may be separate from the plurality of towers from which a tower is selected at block 302 in FIG. 3, but share one or more similar characteristics. For example, the plurality of towers from which a tower is selected at block 302 in FIG. 3 may be towers in Las Vegas, Nevada and the set of towers may be towers in Phoenix, Arizona. In this way, the prediction model is generated from the downtimes of towers in Phoenix, but used to predict downtimes in Las Vegas, which may be beneficial due to similar weather patterns or use of a same wired network.

Process 400 proceeds from block 402 to block 404, where historical weather information associated with downtimes of the set of tower is obtained. Examples of such weather information may include, but are not limited to, temperature data, humidity data, wind data, precipitation data, barometric pressure data, etc. The historical weather information may include specific weather information or weather patterns. In various embodiments, the historical weather information is collected relative to when one or more towers of the set of towers experienced downtime. Accordingly, the historical weather information may be collected at the time of the downtime or within a selected amount of time prior to or after the start of the downtime. Moreover, the historical weather information is collected at or within a defined distance from the geographical location of the tower that experienced a downtime. As an example, the historical weather information may indicate that one or more towers experienced downtime after a hailstorm having penny-sized hail was detected by radar. As another example, the historical weather information may indicate that towers having a specific model of radio experience downtime when the temperature at the tower exceeds 40 degrees Celsius.

Process 400 continues after block 404 at block 406, where historical power-outage information associated with downtimes of the set of towers is obtained. In various embodiments, the historical power-outage information is collected relative to when one or more towers of the set of towers experienced downtime. Accordingly, the historical power-outage information may be collected at the time of the downtime or within a selected amount of time prior to the start of the downtime. Moreover, the historical power-outage information is collected at or within a defined distance from the geographical location of the tower that experienced a downtime. As an example, the historical power-outage information may indicate that five towers within a specific neighborhood experienced downtime within two minutes after a power-outage was detected in separate, but nearby, neighborhood.

Process 400 proceeds from block 406 to block 408, where historical wired-network-downtime information associated with downtimes of the set of towers is obtained. In various embodiments, the historical wired-network-downtime information is collected relative to when one or more towers of the set of towers experienced downtime. Accordingly, the historical wired-network-downtime information may be collected at the time of the downtime or within a selected amount of time prior to the start of the downtime. Moreover, the historical wired-network-downtime information is collected at or within a defined distance from the geographical location of the tower that experienced a downtime. As an example, the historical wired-network-downtime information may indicate that a specific wired network is taken offline for maintenance at 3 AM on the third Thursday of every month, and six specific towers experience downtimes on the same days at the same time as the maintenance.

Process 400 continues after block 408 at block 410, where ticket information associated with downtimes of the set of towers is obtained. Tickets can include a variety of different information regarding a tower or an issue that can be traced to a tower. For example, in some embodiments, a ticket can include the tower's unique identifier. In other embodiments, a ticket can identify a geographic area indicating that the network is unavailable and thus a tower is experiencing downtime.

In various embodiments, the tickets include words, sentences, or other language provided by a person, such as the user of a user device 124 in FIG. 1, indicating that there is an issue with a network. For example, a ticket may include a feedback or input from a user indicating that "I am having a very slow connection at the moment." In this example, the ticket may also include a location, or area, in which the user device is operating. Because the user is experiencing a very slow connection, the user device may be communicating with a tower that is too far away, which can indicate that a nearer tower is experiencing downtime. In some embodiments, tickets may be augmented with additional information indicating which towers were positively experiencing downtimes associated with when the ticket was generated or issued.

Process 400 proceeds from block 410 to block 412, where natural language processing is performed on the tickets to identify tower downtime information associated with the tickets. In various embodiments, one or more rules, statistics, artificial intelligence, or machine learning mechanisms may be employed to identify words, patterns, context, grammar, or other textual nuances of each ticket. These words, patterns, context, grammar, or other textual nuances of the tickets may be used as the tower downtime information.

Process 400 continues after block 412 at block 414, where historical ticket information is generated from the tower downtime information. In various embodiments, the words, patterns, context, grammar, or other textual nuances obtained from each ticket are correlated with one or more towers experiencing downtimes.

Process 400 proceeds from block 414 to block 416, where a prediction model is generated for the set of towers identified at block 402 based on the historical weather information obtained at block 404, the historical power-outage information obtained at block 406, the historical wired-network-downtime information obtained at block 408, and the historical ticket information generated at block 404. In various embodiments, this information is used as training data in one or more artificial intelligence mechanisms or machine learning mechanisms. For example, one or more artificial neural networks or decision trees may be used.

After block 416, process 400 terminates or otherwise returns to a calling process to perform other actions.

Although process 400 is described as obtaining information in a particular sequential order, embodiments are not so limited. Rather, blocks 404, 406, 408, and 410 (in conjunction with blocks 412 and 414) may be performed sequentially in some other order than what is shown or in parallel or some combination thereof.

Figure 5:
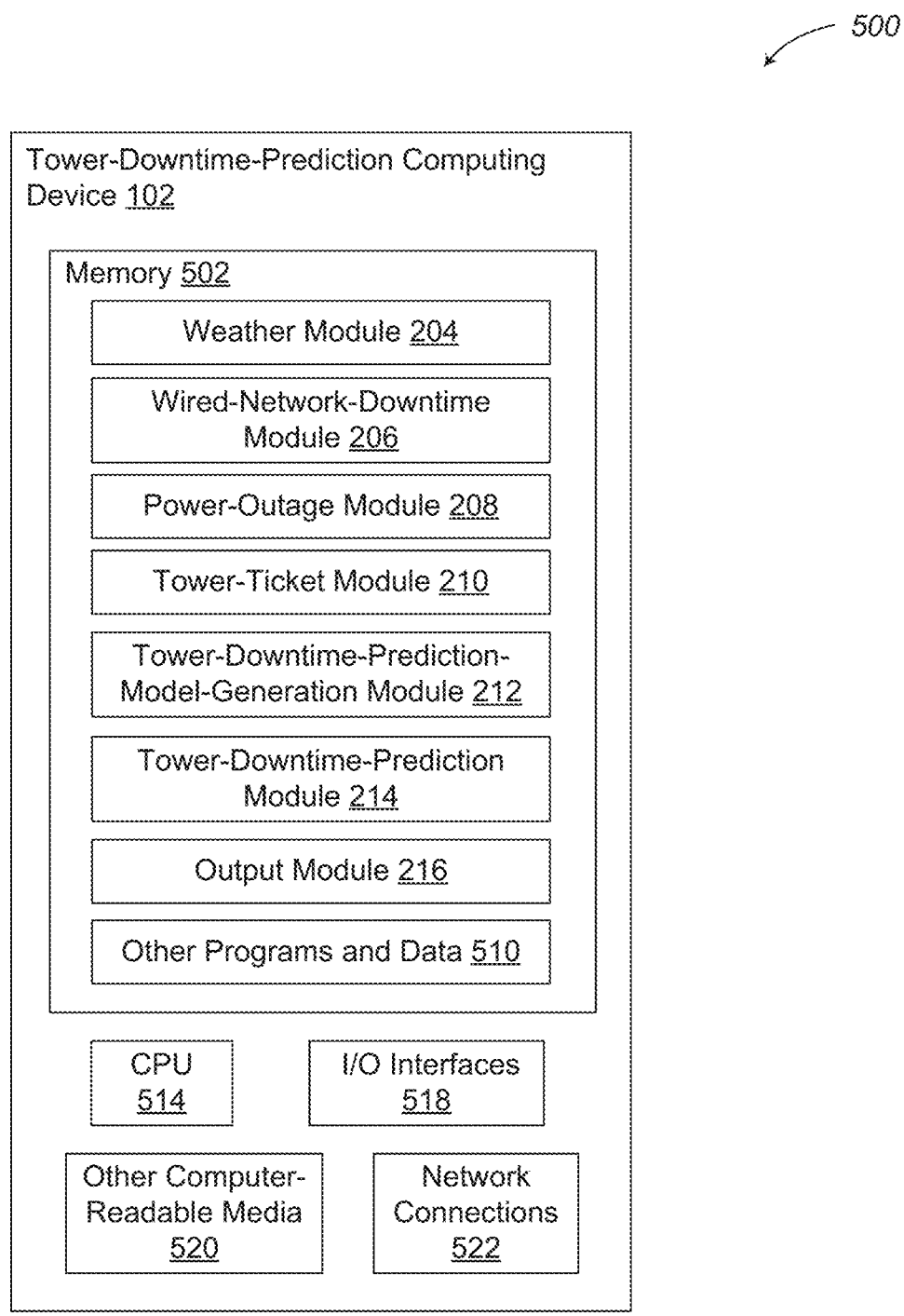
FIG. 5 shows a system diagram that describes various implementations of computing systems for implementing embodiments described herein.

FIG. 5 shows a system diagram that describes various implementations of computing systems for implementing embodiments described herein. System 500 includes a tower-downtime-prediction computing device 102.

The tower-downtime-prediction computing device 102 obtains historical information regarding tower downtimes, generates a prediction model, and employs the prediction model on current information to predict whether one or more towers are likely to experience downtime. One or more special-purpose computing systems may be used to implement the tower-downtime-prediction computing device 102. Accordingly, various embodiments described herein may be implemented in software, hardware, firmware, or in some combination thereof. The tower-downtime-prediction computing device 102 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 502 may be utilized to store information, including computer-readable instructions that are utilized by CPU 514 to perform actions, including embodiments described herein.

Memory 502 may have stored thereon weather module 204, wired-network-downtime module 206, power-outage module 208, tower-ticket module 210, tower-downtime-prediction-model-generation module 212, tower-downtime-prediction module 214, and output module 216. Although the weather module 204, the wired-network-downtime module 206, the power-outage module 208, the tower-ticket module 210, the tower-downtime-prediction-model-generation module 212, the tower-downtime-prediction module 214, and the output module 216 are illustrated as separate modules, embodiments are not so limited. Rather, one module or a plurality of modules may be employed to perform the functionality of the weather module 204, the wired-network-downtime module 206, the power-outage module 208, the tower-ticket module 210, the tower-downtime-prediction-model-generation module 212, the tower-downtime-prediction module 214, and the output module 216. Moreover, the functionality of these modules may also be performed using circuitry or other computer hardware components or software.

The weather module 204 is configured to collect or obtain historical weather information from one or more weather sources or third party systems. The wired-network-downtime module 206 is configured to collect or obtain historical wired-network-downtime information from one or more wired-network sources or third party systems. The power-outage module 208 is configured to collect or obtain historical power-outage information from one or more power-grid sources or third party systems. The tower-ticket module 210 is configured to collect or obtain ticket information associated with tower downtimes from one or more ticketing systems. The tower-downtime-prediction-model-generation module 212 is configured to obtain information from the weather module 204, the wired-network-downtime module 206, the power-outage module 208, or the tower-ticket module 210, or some combination thereof to generate a prediction model to predict tower downtimes. The tower-downtime-prediction module 214 is configured to obtain or collect current information related to one or more towers and employ the prediction model from the tower-downtime-prediction-model-generation module 212 to predict tower downtimes. The output module 216 is configured to provide the tower downtime predictions to one or more administrators, such as via I/O interfaces 518.

Memory 502 may also store other programs and data 510.

Network connections 522 are configured to communicate with other computing devices, such as weather tracking computing system 224, wired network 226, power-grid-management computing system 228, or the ticket-management computing system 230 of FIG. 2. In various embodiments, the network connections 522 include transmitters and receivers (not illustrated) to send and receive data as described herein. I/O interfaces 518 may include a video interfaces, audio interfaces, other data input or output interfaces, or the like. The I/O interfaces 518 may be configured to provide tower downtime predictions to one or more administrators. Other computer-readable media 520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   generating, by a computing device, a plurality of prediction models, wherein each separate prediction model is trained to predict downtimes of towers having a shared characteristic that is specific to those towers;
   selecting, by the computing device, one or more towers in a cellular network, wherein each of the one or more selected towers have a specific shared characteristic;
   selecting, by the computing device, a prediction model from the plurality of prediction models, wherein the selected prediction model is trained to predict downtimes of towers having the specific shared characteristic;
   obtaining, by the computing device, current information associated with the one or more selected towers;
   generating, by the computing device, a downtime prediction for the one or more selected towers based on the selected prediction model and the current information; and
   providing, by the computing device, the downtime prediction for the one or more selected towers to an administrator.

2. The method of claim 1, further comprising:
   identifying, by the computing device, a set of towers having the specific shared characteristic with the one or more selected towers;
   obtaining, by the computing device, historical weather information associated with downtimes of the set of towers; and
   generating, by the computing device, the prediction model based on the historical weather information relative to the downtimes of the set of towers.

3. The method of claim 1, further comprising:
   identifying, by the computing device, a set of towers having the specific shared characteristic with the one or more selected towers;
   obtaining, by the computing device, historical power-outage information associated with downtimes of the set of towers; and
   generating, by the computing device, the prediction model based on the historical power-outage information relative to the downtimes of the set of towers.

4. The method of claim 1, further comprising:
   identifying, by the computing device, a set of towers having the specific shared characteristic with the one or more selected towers;
   obtaining, by the computing device, historical wired-network-downtime information associated with downtimes of the set of towers; and
   generating, by the computing device, the prediction model based on the historical wired-network-downtime information relative to the downtimes of the set of towers.

5. The method of claim 1, further comprising:
   receiving, by the computing device, tickets associated with downtimes of a set of towers having the specific shared characteristic with the one or more selected towers;
   performing, by the computing device, natural language processing on the tickets to identify tower downtime information associated with the tickets;
   generating, by the computing device, historical ticket information based on the identified tower downtime information associated with the tickets; and
   generating, by the computing device, the prediction model based on the historical ticket information relative to the downtimes of the set of towers.

6. The method of claim 1, further comprising:
   identifying, by the computing device, a set of towers having the specific shared characteristic with the one or more selected towers;

obtaining, by the computing device, historical weather information associated with downtimes of the set of towers;
obtaining, by the computing device, historical power-outage information associated with downtimes of the set of towers;
obtaining, by the computing device, historical wired-network-downtime information associated with downtimes of the set of towers; and
generating, by the computing device, the prediction model based on the historical weather information, the historical wired-network-downtime information, and the historical wired-network-downtime information relative to the downtimes of the set of towers.

7. The method of claim 1, further comprising:
identifying, by the computing device, a set of towers having the specific shared characteristic with the one or more selected towers;
obtaining, by the computing device, historical weather information associated with downtimes of the set of towers;
obtaining, by the computing device, historical power-outage information associated with downtimes of the set of towers;
obtaining, by the computing device, historical wired-network-downtime information associated with downtimes of the set of towers;
performing, by the computing device, natural language processing on tickets associated with downtimes of the set of towers to identify tower downtime information associated with the tickets;
generating, by the computing device, historical ticket information based on the identified tower downtime information associated with the tickets; and
generating, by the computing device, the prediction model based on the historical weather information, the historical wired-network-downtime information, the historical wired-network-downtime information, and the historical ticket information relative to the downtimes of the set of towers.

8. A computing device, comprising:
a memory that stores computer instructions; and
a processor that executes the computer instructions to:
select one or more towers in a cellular network;
obtain a prediction model trained to predict downtimes of towers sharing a characteristic with the one or more selected towers;
obtain current information associated with the one or more selected towers;
generate a downtime prediction for the one or more selected towers based on the prediction model and the current information; and
provide the downtime prediction for the one or more selected towers to an administrator.

9. The computing device of claim 8, wherein the processor further executes the computer instructions to:
identify a set of towers sharing the characteristic with the one or more selected towers;
obtain historical weather information associated with downtimes of the set of towers; and
generate the prediction model based on the historical weather information relative to the downtimes of the set of towers.

10. The computing device of claim 8, wherein the processor further executes the computer instructions to:
identify a set of towers sharing the characteristic with the one or more selected towers;
obtain historical power-outage information associated with downtimes of the set of towers; and
generate the prediction model based on the historical power-outage information relative to the downtimes of the set of towers.

11. The computing device of claim 8, wherein the processor further executes the computer instructions to:
identify a set of towers sharing the characteristic with the one or more selected towers;
obtain historical wired-network-downtime information associated with downtimes of the set of towers; and
generate the prediction model based on the historical wired-network-downtime information relative to the downtimes of the set of towers.

12. The computing device of claim 8, wherein the processor further executes the computer instructions to:
receive tickets associated with downtimes of a set of towers sharing the characteristic with the one or more selected towers;
perform natural language processing on the tickets to identify tower downtime information associated with the tickets;
generate historical ticket information based on the identified tower downtime information associated with the tickets; and
generate the prediction model based on the historical ticket information relative to the downtimes of the set of towers.

13. The computing device of claim 8, wherein the processor further executes the computer instructions to:
identify a set of towers sharing the characteristic with the one or more selected towers;
obtain historical weather information associated with downtimes of the set of towers;
obtain historical power-outage information associated with downtimes of the set of towers;
obtain historical wired-network-downtime information associated with downtimes of the set of towers; and
generate the prediction model based on the historical weather information, the historical wired-network-downtime information, and the historical wired-network-downtime information relative to the downtimes of the set of towers.

14. The computing device of claim 8, wherein the processor further executes the computer instructions to:
identify a set of towers sharing the characteristic with the one or more selected towers;
obtain historical weather information associated with downtimes of the set of towers;
obtain historical power-outage information associated with downtimes of the set of towers;
obtain historical wired-network-downtime information associated with downtimes of the set of towers;
perform natural language processing on tickets associated with downtimes of the set of towers to identify tower downtime information associated with the tickets;
generate historical ticket information based on the identified tower downtime information associated with the tickets; and
generate the prediction model based on the historical weather information, the historical wired-network-downtime information, the historical wired-network-downtime information, and the historical ticket information relative to the downtimes of the set of towers.

15. A non-transitory processor-readable storage medium having contents stored thereon that, when executed by one or more processors, cause the one or more processors to perform actions, the actions comprising:
- identifying a set of towers sharing the characteristic with one or more target towers in a cellular network;
- obtaining historical weather information associated with downtimes of the set of towers;
- obtaining historical power-outage information associated with downtimes of the set of towers;
- obtaining historical wired-network-downtime information associated with downtimes of the set of towers;
- obtaining tickets associated with downtimes of the set of towers;
- performing natural language processing on the tickets associated with downtimes of the set of towers to identify tower downtime information associated with the tickets;
- generating historical ticket information based on the identified tower downtime information associated with the tickets; and
- generating a prediction model based on the historical weather information, the historical wired-network-downtime information, the historical wired-network-downtime information, and the historical ticket information relative to the downtimes of the set of towers to predict downtimes of the one or more target towers.

16. The non-transitory processor-readable storage medium of claim 15, wherein the contents, when executed by the one or more processors, cause the one or more processors to perform further actions, the further actions comprising:
- obtaining, by the computing device, current information associated with the one or more selected towers;
- generating, by the computing device, a downtime prediction for the one or more selected towers based on the prediction model and the current information; and
- providing, by the computing device, the downtime prediction for the one or more selected towers to an administrator.

17. The non-transitory processor-readable storage medium of claim 15, wherein the contents, when executed by the one or more processors to identify the set of towers, cause the one or more processors to perform further actions, the further actions comprising:
- selecting towers that are in a same network, are in a same geographical area, have a same hardware component, have a same hardware configuration, or are being monitored for downtime.

18. The non-transitory processor-readable storage medium of claim 15, wherein the contents, when executed by the one or more processors to obtain the historical weather information associated with the downtimes of the set of towers, cause the one or more processors to perform further actions, the further actions comprising:
- collecting information of weather patterns relative to the set of towers being down.

19. The non-transitory processor-readable storage medium of claim 15, wherein the contents, when executed by the one or more processors to obtain the historical power-outage information associated with the downtimes of the set of towers, cause the one or more processors to perform further actions, the further actions comprising; and
- collecting information identifying when a power outage in a geographical area of the set of towers occurred relative to the set of towers being down.

20. The non-transitory processor-readable storage medium of claim 15, wherein the contents, when executed by the one or more processors to obtain the historical wired-network-downtime information associated with the downtimes of the set of towers, cause the one or more processors to perform further actions, the further actions comprising:
- collecting information identifying when a wired network associated with the set of towers is down relative to the set of towers being down.

* * * * *